United States Patent [19]

Ohta

[11] Patent Number: 5,195,147
[45] Date of Patent: Mar. 16, 1993

[54] IMAGE FORMING APPARATUS

[75] Inventor: Junichi Ohta, Yokohama, Japan

[73] Assignee: Ricoh Company, Ltd., Tokyo, Japan

[21] Appl. No.: 516,924

[22] Filed: Apr. 30, 1990

[30] Foreign Application Priority Data

| May 2, 1989 | [JP] | Japan | 1-112203 |
| May 2, 1989 | [JP] | Japan | 1-112204 |
| Dec. 28, 1989 | [JP] | Japan | 1-338153 |

[51] Int. Cl.$^5$ .................................. G06K 9/48
[52] U.S. Cl. .................................. 382/21; 382/9
[58] Field of Search .................. 382/21, 22, 60, 57, 382/9, 61, 59, 23

[56] References Cited

U.S. PATENT DOCUMENTS

| 4,426,731 | 1/1984 | Edlund et al. | 358/261.4 |
| 4,646,351 | 2/1987 | Asbo et al. | 382/21 |
| 4,672,677 | 6/1987 | Yamakawa | 382/57 |
| 4,757,551 | 7/1988 | Kobayashi et al. | 382/18 |
| 4,881,130 | 11/1989 | Hayashi | 382/57 |
| 4,903,312 | 2/1990 | Sato | 382/21 |
| 4,933,865 | 6/1990 | Yamamoto et al. | 382/16 |
| 4,956,869 | 9/1990 | Miyatake et al. | 382/21 |

FOREIGN PATENT DOCUMENTS

| 54-118720 | 9/1979 | Japan |
| 58-85670 | 5/1983 | Japan |
| 61-255483 | 11/1986 | Japan |
| 62-281082 | 12/1987 | Japan |
| 62-290984 | 12/1987 | Japan |
| 64-53281 | 3/1989 | Japan |

OTHER PUBLICATIONS

Yutaka Ohsawa et al, "Picture Processing Using Multi-Dimensional Data Management Structure-Vectorization of Drawings," *Institute of Electronics and Communication Engineers of Japan*, vol. J68-D, No. 4, pp. 845-852.

*Primary Examiner*—Jin F. Ng
*Assistant Examiner*—Dov Popovici
*Attorney, Agent, or Firm*—Mason, Fenwick & Lawrence

[57] ABSTRACT

An image forming apparatus capable of reproducing a hand-written document by automatically correcting it. The apparatus discriminates figure images including hand-written rules and character images which are carried on a document. Thereafter, the apparatus corrects, among the figure images, straight lines images in a designated direction while preserving their relationship to the other figure images as to connection. Further, the apparatus changes the distance between nearby straight line image such that all the straight line images are spaces apart by the same distance.

10 Claims, 15 Drawing Sheets

Fig.3

| スキャナ部仕様 | | |
|---|---|---|
| 項目 | 仕様値 | 備考 |
| 1. 方式 | xxxx | xxxxxxxxxx |
| | xxxx | |
| 2. 読み取リサイズ | | xxxxx |
| 最大 | xxxx | |
| 最小 | xxxx | |
| 3. 読み取リ倍率 | | xxxxxxxx |
| 最大 | xxxx | |
| 最小 | xxxx | |

| スキャナ部仕様 | | |
|---|---|---|
| 項　目 | 仕　様　値 | 備　考 |
| 1. 方式 | | |
| | XXXX | XXXXXXXXXX |
| | XXXX | |
| 2. 読み取りサイズ | | XXXXX |
| 　最大 | XXXX | |
| 　最小 | XXXX | |
| 3. 読み取り倍率 | | XXXXXXXX |
| 　最大 | XXXX | |
| 　最小 | XXXX | |

| スキャナ部仕様 | | |
|---|---|---|
| 項 目 | 仕 様 値 | 備 考 |
| 1. 方式 | XXXX<br>XXXX | XXXXXXXXXX |
| 2. 読み取りサイズ<br>　最大<br>　最小 | <br>XXXX<br>XXXX | XXXXX |
| 3. 読み取り倍率<br>　最大<br>　最小 | XXXX　XXXX<br>XXXX　XXXX | XXXXXXXX |

20

| START X | START Y | LENGTH X | LENGTH Y |
|---------|---------|----------|----------|
| i | j | 5 | 4 |
| . | . | . | . |
| . | . | . | . |
| . | . | . | . |

| Y POSITION | X START | X END |
|---|---|---|
| . . . | . . . | . . . |
| 35 | 130 | 136 |
| 35 | 140 | 142 |
| 36 | 129 | 137 |
| 36 | 139 | 143 |
| 37 | 130 | 143 |
| . . . | . . . | . . . |

Fig.16

| 番号 | 内容 | 備考 |
|---|---|---|
| 1 | XXXXXXXXXXXX | XXXXXXXXXX |
| 2 | XXXXXXXX | XXXXXXXX |
| 3 | XXXXXXXX | XXXXXXXX |
| 4 | XXXXXXXX | XXXXXXXX |
| 5 | XXXXXXXX | XXXXXXXX |
| 6 | XXXXXXXX | XXXXXXXX |

| 番号 | 内容 | 備考 |
|---|---|---|
| 1 | XXXXXXXXXXXX | XXXXXXXXXX |
| 2 | XXXXXXXX | XXXXXXXX |
| 3 | XXXXXXXX | XXXXXXXX |
| 4 | XXXXXXXX | XXXXXXXX |
| 5 | XXXXXXXX | XXXXXXXX |
| 6 | XXXXXXXX | XXXXXXXX |

Fig.18

| 番号 | 内容 | 備考 |
|---|---|---|
| 1 | XXXXXXXXXXXX | XXXXXXXXXX |
| 2 | XXXXXXXX | XXXXXXXX |
| 3 | XXXXXXXX | XXXXXXXX |
| 4 | XXXXXXXX | XXXXXXXX |
| 5 | XXXXXXXX | XXXXXXXX |
| 8 | XXXXXXXX | XXXXXXXX |

図中の番号1～3は、XXXX XXX、

· · · ·

| 番号 | 内容 |
|---|---|
| 1 | XXX |
| 2 | XXX |
| 3 | XXX |
| 4 | XXX |
| 5 | XXX |

IMAGE FORMING APPARATUS

BACKGROUND OF THE INVENTION

The present invention relates to a digital copier, facsimile apparatus, word processor or similar image forming apparatus. More particularly, the present invention is concerned with an image forming apparatus capable of recognizing graphic images including hand-written lines such as rules and text images carried on a document and then outputting the images after automatically correcting them.

Conventional digital copiers are not provided with a function of recognizing images. Hence, when a document carrying graphic images including hand-written lines such as rules and text images thereon is to be reproduced, it has to be rewritten by using a rule so that the hand-written lines may appear neat, i.e., straight lines and circles may appear as such. Further, when it is desired to equally space the hand-written rules from one another, the hand-written lines on the document have to be erased and then drawn again by using a rule or the entire document has to be rewritten. Preparing such a document is time- and labor-consuming, and the document is not neat.

SUMMARY OF THE INVENTION

It is therefore an object of the present invention to provide an image forming apparatus capable of reproducing a hand-written document after automatically correcting the document.

It is another object of the present invention to provide an image forming apparatus capable of reproducing hand-written rules after automatically correcting the distance between nearby rules.

It is another object of the present invention to provide a generally improved image forming apparatus.

In accordance with the present invention, an image forming apparatus comprises a document reading unit for optically reading a document to photoelectrically convert the document into two-level image data, a contour tracing unit for tracing a contour of an assembly of black pixels included in the image data and which are contiguous with one another, an image discriminating unit for classifying the assembly of black pixels into one of a figure, a character, and noise on the basis of a size of the contour of the assembly of black pixels which is determined by the contour tracing unit, a vector generating unit for extracting figure images on the basis of discrimination data produced by the image discriminating unit and transforming the figure images into vectors, a figure recognizing unit for recognizing figure elements on the basis of vector data produced by the vector generating unit and recognizing a relationship of the figure elements to one another as to connection, a figure correcting unit for correcting, among the figure elements recognized by the figure recognizing unit, straight line elements in, among directions for arranging straight lines and selected at the beginning of a copying opeation, a particular direction which is smaller in difference in angle than the others, while preserving a relationship of the straight line elements to the other figure elements as to connection, an image framing unit for framing the figure elements corrected by the figure correcting unit in a store, and an outputting unit for reading the corrected images out of the store and forming the images on a paper sheet.

Also, in accordance with the present invention, an image forming apparatus comprises a document reading unit for optically reading a document to photoelectrically convert the document into two-level image data, a contour tracing unit for tracing a contour of an assembly of black pixels included in the image data and which are contiguous with one another, an image discriminating unit for classifying the assembly of black pixels into one of a figure, a character, and noise on the basis of a size of the contour of the assembly of black pixels which is determined by the contour tracing unit, a vector generating unit for extracting figure images on the basis of discrimination data produced by the image discriminating unit and transforming the figure images into vectors, a figure recognizing unit for recognizing figure elements on the basis of vector data produced by the vector generating unit and recognizing a relationship of the figure elements to one another as to connection, a figure correcting unit for correcting, when three or more straight line elements included in the figure elements recognized by the figure recognizing unit are substantially parallel and spaced apart by distances differences of which are smaller than a predetermined threshold, the straight line elements such that the straight line elements are equally spaced apart by a mean value of the distances, while preserving a relationship of the straight line elements to the other figure elements, an image framing unit for framing the figure elements corrected by the figure correcting unit in a store, and an outputting unit reading the corrected images out of the store and forming the images on a paper sheet.

BRIEF DESCRIPTION OF THE DRAWINGS

The above and other objects, features and advantages of the present invention will become more apparent from the following detailed description taken with the accompanying drawings in which:

FIG. 3 shows a document carrying specific images thereon;

FIG. 4 shows output images associated with the document of FIG. 3;

FIG. 5 shows a document a part of which is marked for correction;

FIG. 16 shows a document carrying specific images thereon;

FIG. 17 shows a particular stage of document correction processing associated with FIG. 16;

FIG. 18 shows output images associated with the document of FIG. 16; and

FIG. 19 shows a document a part of which is marked for correction.

DESCRIPTION OF THE PREFERRED EMBODIMENTS

Preferred embodiments of the present invention will be described with reference to the accompanying drawings.

First Embodiment

Figure 1:
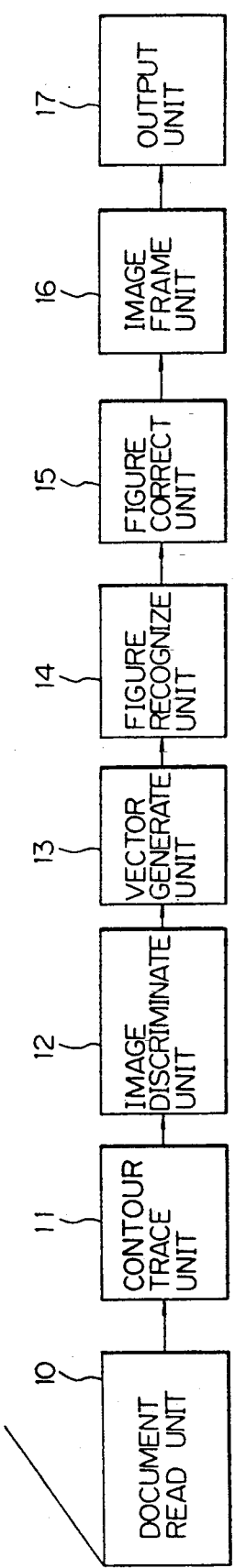
FIG. 1 is a block diagram schematically showing a first embodiment of the image forming apparatus in accordance with the present invention.
Figure 2:
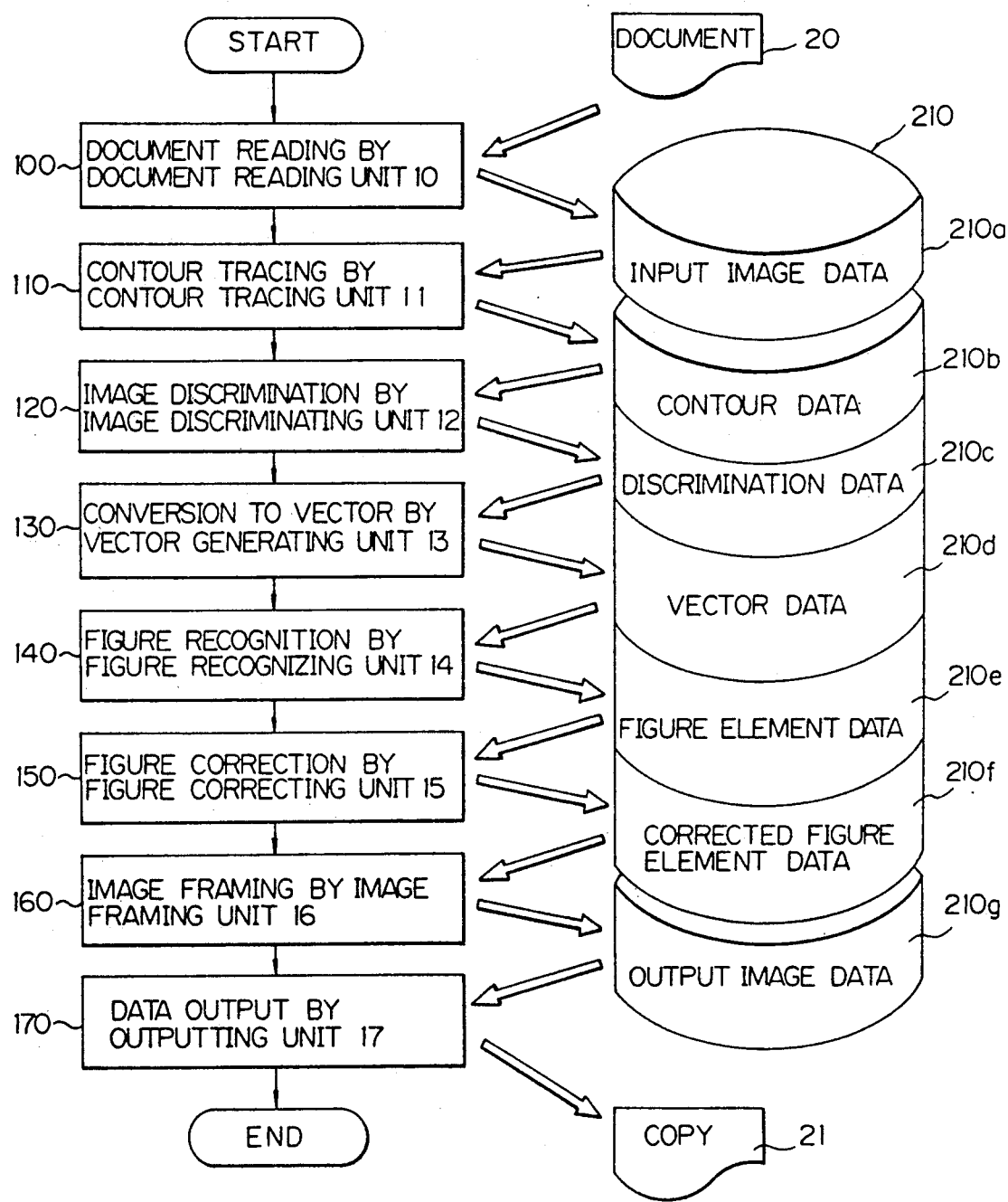
FIG. 2 demonstrates the concept of system control particular to the first embodiment as well as to a second embodiment which will be described.

Referring to FIG. 1 of the drawns, an image forming apparatus embodying the present invention is shown. As shown, the apparatus is generally made up of a document reading unit 10, a contour tracing unit 11, a figure discriminating unit 12, a vector generating unit 13, a figure recognizing unit 14, a figure correcting unit 15, an image framing unit 16, and an outputting unit 17. FIG. 2 schematically shows the system control particular to the illustrative embodiment, while FIG. 3 shows a document 20 carrying specific images.

In operation, after the document 20 shown in FIG. 3 has been laid on a glass platen of a digital copier, an operation board, not shown, is manipulated to select the function or mode particular to the illustrative embodiment and the directions for arranging straight lines (e.g. four directions with respect to the vertical and horizontal). When a copy start button is pressed, the document reading unit 10 optically reads the document 20 (step 100) to transform the images on the document 20 into digital data. The resulted digital data are written to a store 210 as input image data 210a. The contour tracing unit 11 reads the input image data 210a out of the store 210 and traces the contour of an assembly of adjoining black pixels (step 110). By such an operation, the contour tracing unit 11 determines the minimum values and lengths of the contour in the main and subscanning directions and writes them to the store 210 as contour data 210b. After the contour tracing unit 11 has traced all the contours included in the input image data 210a, the figure discriminating unit 12 reads the contour data 210b out of the store 210 and checks the size of each contour to see if the assembly of black pixels in the input image data 210a is a noise image, a character image or a figure image (step 120). The result of discrimination is written to the store 210 as discrimination data 210c.

The vector generating unit 13 reads the discrimination data 210c out of the store 210 to extract figure images and transforms them into vectors (step 130), the resultant vector data 210d being written to the store 210. The figure recognizing unit 14 reads the vector data 210d out of the store 210, identifies straight lines, circles and other similar figure elements, and determines the relationship of the figure elements as to connection (step 140). The results of recognition so performed by the unit 14 are written to the store 210 as figure element data 210e. The figure correcting unit 15 reads the figure element data 210e out of the store 210 by referencing the information which has been entered at the beginning of the copying operation for designating the directions for arranging lines. The figure correcting unit 15 corrects each figure element data 210e in a particular direction which is smaller in the difference in the angle to the associated designated direction than the others, while preserving its relationship to the other figure elements. The output of the figure correcting unit 15 are written to the store 210 as corrected figure element data 210f (step 150).

The image framing unit 16 writes the corrected figure element data 210f and the images which the image discriminating unit 12 has determined to be characters to the store 210 as output image data 210g (step 160). Finally, the outputting unit 17 reads the output image data 210g out of the store 210, prints them out on a paper sheet 21, and then discharges the paper sheet (step 170). FIG. 4 shows the paper sheet 21 on which the images undergone the above processing are printed out.

FIG. 5 shows a specific document only a part of which is to be processed. As shown, with the illustrative embodiment, it is also possible to process only a desired part of a document by marking it. Such partial processing will be completed within a shorter period of time than the overall processing stated above.

Figure 6A:
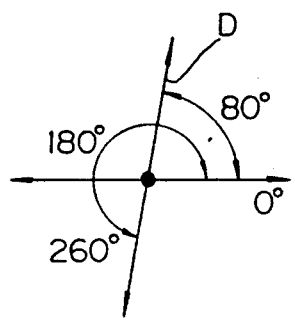
FIGS. 6A, 6B and 6C show a specific output image attainable by designating directions in which straight lines should be arranged.
Figure 6B:
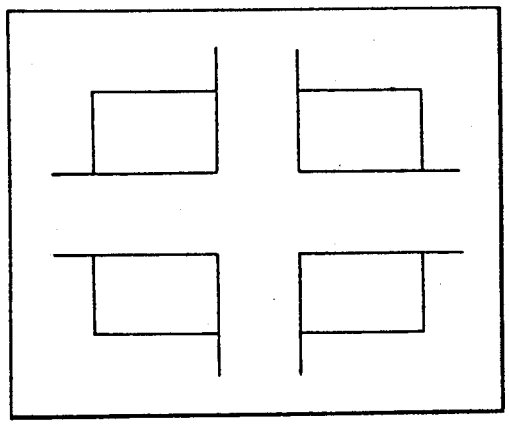
Figure 6C:
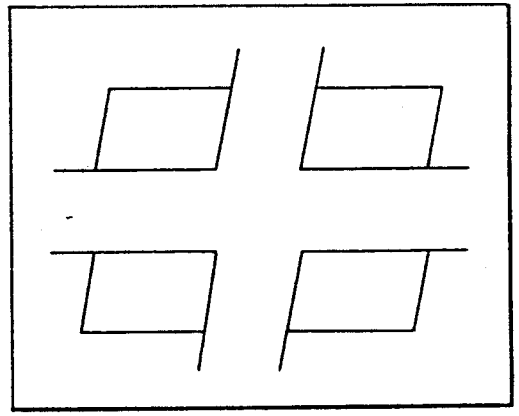

FIGS. 6A, 6B and 6C demonstrate how the orientation of an output image changes in conformity to a direction designated for arranging straight lines. Specifically, when an arranging direction D shown in FIG. 6A is selected, a document image shown in FIG. 6B will be reproduced in a different orientation as shown in FIG. 6C.

The sequence of steps outlined above with reference to FIG. 2 will be described more specifically.

(1) Tracing Contour

An input image is scanned by raster scanning to search for a particular black pixel at which tracing should begin. Contour pixels are sequentially traced conterclockwise if they are located outward of the starting pixel or clockwise if they are located inward of the same. A single assembly of black pixels is fully traced when the tracing reaches the starting pixel again. Such a procedure is repeated until all the contour pixels have been traced.

Figure 7:
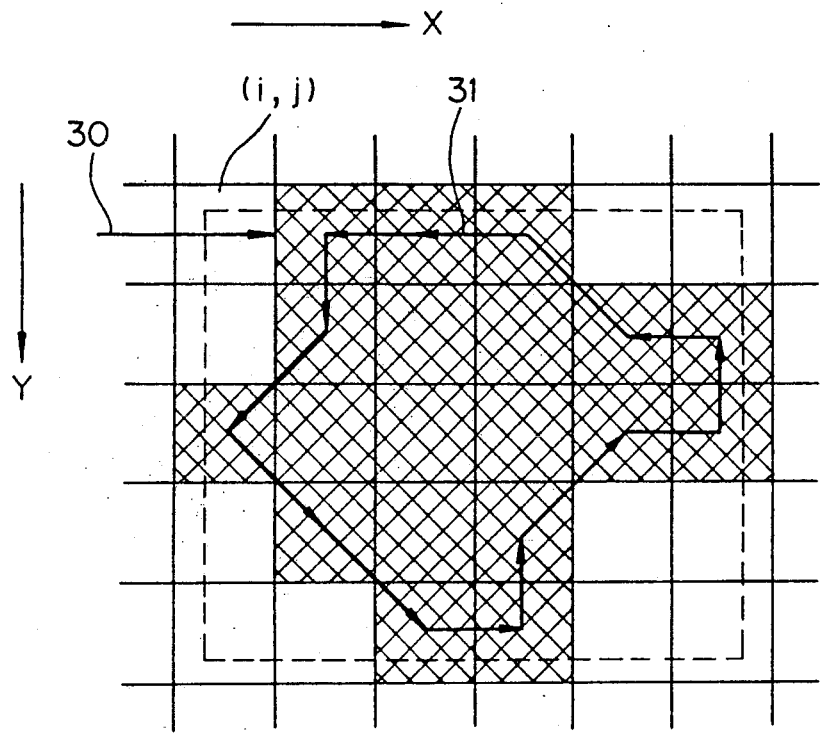
FIGS. 7 and 8 show a method of tracing a contour.
Figure 8:
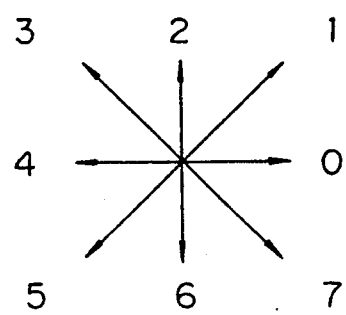

FIG. 7 shows a specific assembly of black pixels which are sequentially traced as indicated by arrows. A contour is assumed to extend in eight difference directions 0 to 7 as shown in FIG. 8. Specifically, the assembly of black pixels shown in FIG. 7 is scanned by raster scanning as indicated by an arrow 30. Assume that a black pixel (i+1, j) has been found by the raster scanning first. Then, since the pixel immediately preceding the black pixel (i+1, j) is a white pixel, the contour is determined to be an outer contour. At this instant, tracing begins at the pixel of interest and proceeds counterclockwise. Pixels surrounding the black pixel (i+1, j) are sequentially examined counterclockwise in the eight different directions shown in FIG. 8, the direction 4 being first. The direction in which a first black pixel is found as viewed from the pixel (i+1, j) is determined to be the direction of the contour. Then, the pixel of interest is shifted from the pixel (i+1, j) to the first adjoining black pixel. In this condition, pixels surrounding the new pixel of interest are sequentially examined counterclockwise, the direction −2 of the previous contour being first. Such a procedure is repeated until the tracing reaches the starting pixel (i+1, j) again. In the specific pixels shown in FIG. 7, the contour is traced as indicated by arrows 31.

Figures 9, 10:
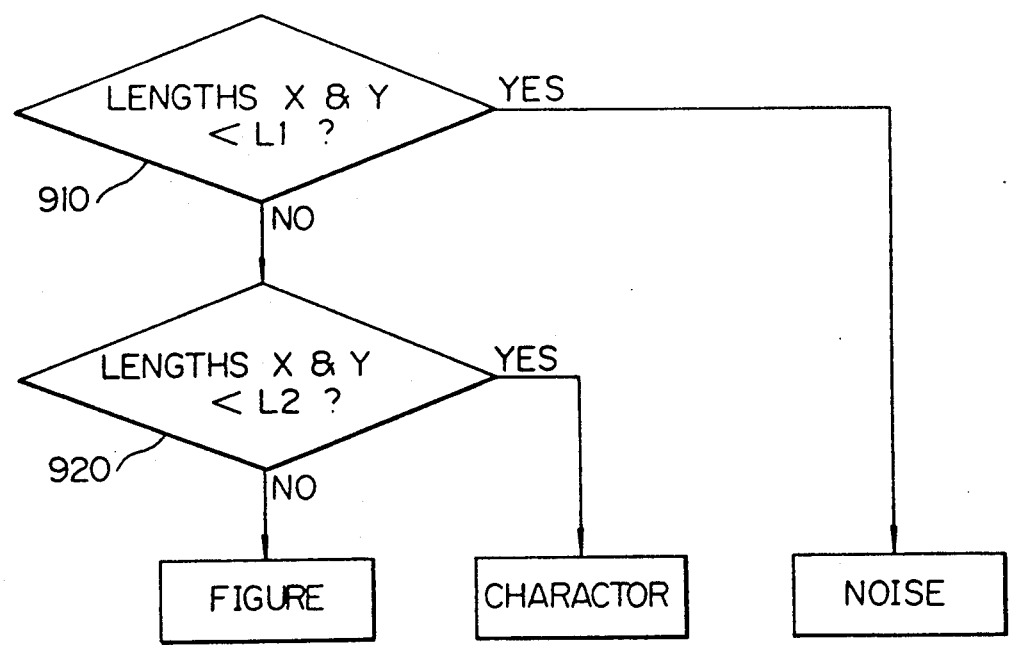
FIG. 9 shows data for discriminating images.
FIG. 10 is a flowchart demonstrating the method of FIGS. 7, 8 and 9.

FIG. 9 tabulates data for the discrimination of images which will be described. The contour data 210b written to the store 210 are representative of outer contours only. As shown in FIG. 9, the contour data 210b are produced by determining the maximum and minimum values of contour coordinates and are made up of start positions (minimum values) and lengths (maximum value — minimum value). In FIG. 9, the first row is representative of the result of tracing associated with the contour of FIG. 7.

(2) Discriminating Image

Among the contour data 210b resulted from tracing, the size measured in the main scanning direction X and subscanning direction Y is examined to see if the image surrounded by the contour line is noise, character or figure. Assume that noise images and character images have sizes the upper limits of which are predetermined to be L1 and L2, respectively. Then, as shown in FIG. 10, when both of the lengths X and Y are smaller than the upper limit L1 (YES, step 910), the image surrounded by the contour line is determined to be a noise image. When both of the lengths X and Y are greater than the upper limit L1 (NO, step 910) and smaller than the upper limit L2 (YES, step 920), the image of interest is determined to be a character image. In the other cases, the image of interest is determined to be a figure image.

Figure 11:
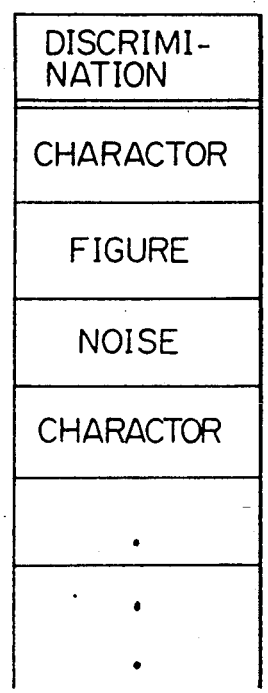
FIG. 11 shows a data area for practicing the image discriminating method.

FIG. 11 shows a data area assigned to the discrimination of images. The results of discrimination are coded and registered as the discrimination data 210c in the order shown in FIG. 9. When the magnification is changed, images cannot be accurately discriminated unless the upper limits L1 and L2 are changed in conformity to the magnification change ratio. In the event of magnification change, therefore, discrimination is executed by replacing the upper limits L1 and L2 with L'1 and L'2 which are expressed as:

$$L'1 = L1 \times R$$

$$L'2 = L2 \times R$$

where R is a magnification change ratio.

(3) Generating Vector

For transforming a two-level graphic line image into vectors, there have been proposed some different elaborated approaches in, for example, Collection of Papers, the Institute of Electronic and Communication Engineers of Japan, Vol. J68-D, No. 4, pp. 845–852, April 1985 and Japanese Patent Laid-Open Publication (Kokai) No. 286177/1987. The proposed approaches render a line image by approximation, i.e., by tracing contour lines which delimit a line image at opposite sides while determining a center line intervening between the opposite contour lines and then transforming the center line into vectors.

(4) Others

Memory devices available at the present stage of technologies are still expensive. Hence, it is preferable to implement the function of the present invention by using a minimum number of memories.

In the light of the above, a document may be read in a reduced scale and read out in an enlarged scale. This kind of scheme reduces the number of arithmetic operations to be performed between the input and the output and thereby the overall processing time.

Alternatively, the input image data 210a representative of a document may be compressed, processed, and then expanded in the event of output. While such compression and expansion may be effected by the MH (Modified Huffman) coding principle usually practiced with a facsimile machine, for example, it is desirable to use the run-lengths of black pixels because it is only black pixels that are needed, as follows.

Figure 12:
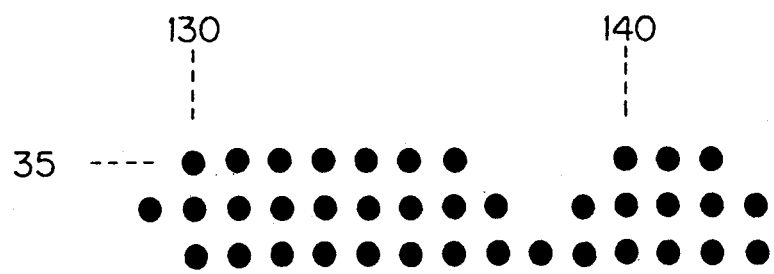
FIGS. 12, 13 and 14 show a specific procedure for compressing and expanding image data by using the run-lengths of black pixels.
Figures 13, 14:
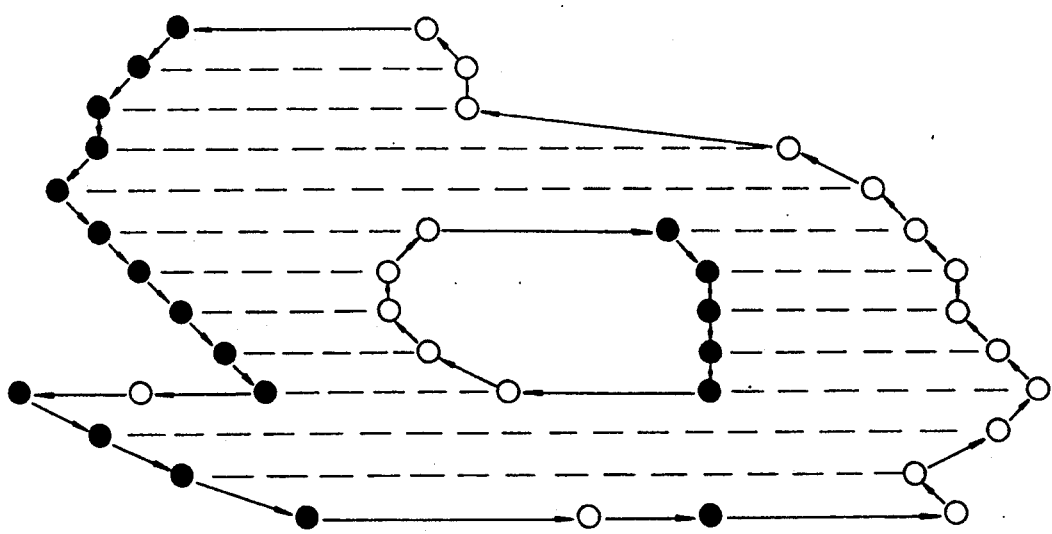

FIGS. 12, 13 and 14 show a specific procedure for compressing and expanding image data by using the run-lengths of black pixels. As shown in FIGS. 12 an 13, the data are composed of positions in subscanning direction Y and start and end positions in the main scanning direction X and are sequentially registered according to the raster scanning order. Since the input image has a compressed data structure, the above-described contour tracing method is not applicable thereto and is replaced by a method which will be described with reference to FIG. 14.

FIG. 14 shows a specific compressed image the contour of which is to be traced. The tracing procedure is as follows.

(1) Compressed image data are sequentially scanned in the subscanning direction to search for a black pixel start point which has not been traced.

(2) From the black pixel start point, the tracing proceeds in the positive Y direction (direction in which the subscannin line number increases) so as to search for a black pixel start point which has not been traced.

(3) When the black pixel start point of interest is located closer to the black pixel end point of a string of black pixels which precedes it on the same subscanning line than to a black pixel start point existing on the next subscanning line as determined in the step (2), the tracing advances to the preceding black pixel end point on the same subscanning line. Then, the search for a black pixel end point begins in the negative Y direction at the above-mentioned black pixel end point.

(4) When no black pixel start points which have not been traced are found, the tracing advances to the black pixel end point of the black pixel string of interest. Then, the tracing advances from that black pixel end point in the negative Y direction to search for a black pixel end point.

(5) When the black pixel end point is located closer to the black pixel start point of the next black pixel string on the same subscanning line than to a black pixel end point on the next subscanning line as determined in the step (3) or (4), the tracing advances to the black pixel start point of the next black pixel string on the same subscanning line. Then, the tracing continues from that point to search for a black pixel start point in the positive Y direction.

(6) A single contour loop is fully traced when the tracing returns to the start point determined in the step (1) after the repetitive steps (2) to (5). Then, the procedure returns to the step (1) for searching for the next tracing start point.

(7) The steps (1) to (6) are repeated until all the black pixel start points have been traced.

The method described above with reference to FIG. 14 examines only the start points and end points of black pixels and, therefore, completes the processing rapidly. Further, the data structure shown in FIG. 13 may be provided with flags associated with the run-lengths of black pixels. Specifically, an arrangement may be made such that every time a contour loop is traced, the image is discriminated and an identification code representative of the result of discrimination is written to a flag. This is successful in eliminating the need for a memory for output image and in separating nearby images with accuracy.

Second Embodiment

Figure 15:
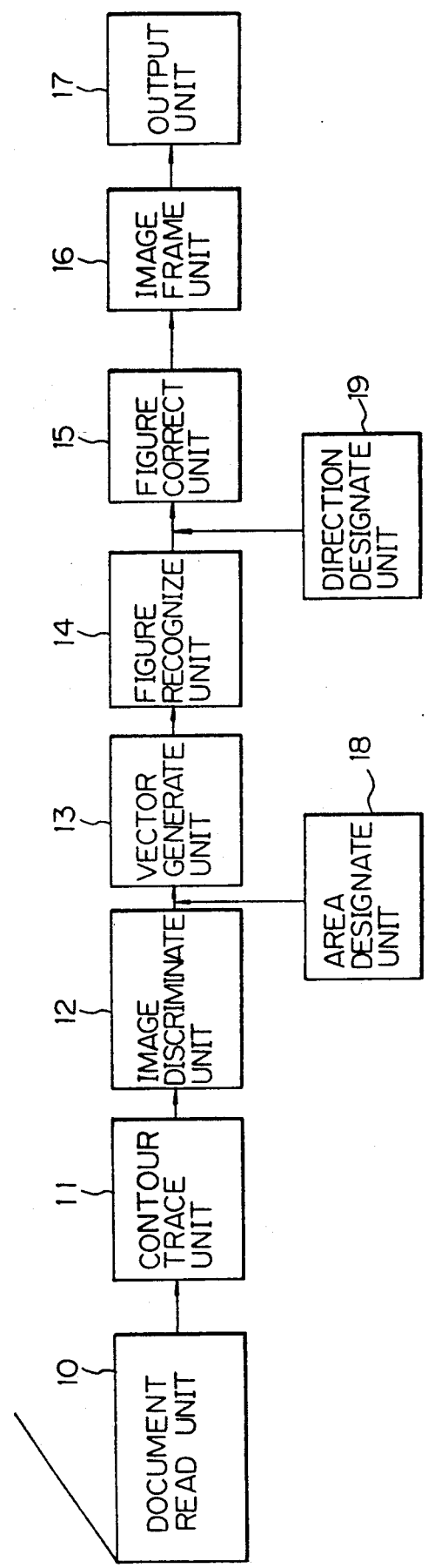
FIG. 15 is a shcmeatic block diagram showing a second embodiment of the image forming apparatus in accordance with the present invention.

Referring to FIG. 15, an alternative embodiment of the image forming apparatus in accordance with the present invention is shown. As shown, the apparatus includes an area designating unit 18 and a direction designating unit 19 in addition to the various units of the first embodiment. The area designating unit 18 is connected to the output of the image discriminating unit 12, while the direction designating device 19 is connected to the output of the figure recognizing unit 14. The area designating unit 18 marks an area which is to be processed by the vector generating unit 13, figure recognizing unit 14, and figure correcting unit 15. The direction designating unit 19 designates a direction in which straight line elements should be arranged. The system control of this embodiment is identical with the system control of FIG. 2 and, therefore, the following description will be made with reference to FIG. 2 also.

After a document such as a document 20 shown in FIG. 16 has been laid on a glass platen of a digital copier, an operation board, not shown, is manipulated to select the function or mode of the illustrative embodiment and the direction for arranging straight lines (e.g. four directions with respect to the vertical and horizontal). When a copy start button is pressed, the document reading unit 10 optically reads the document 20 (step 100) to transform the images on the document 20 into digital data. The resulted digital data are written to the store 210 as input image data 210a. The contour tracing device 11 reads the input image data 210a out of the store 210 and traces the contour of an assembly of adjoining black pixels (step 110). By such an operation, the contour tracing unit 11 determines the minimum values and lengths of the contour in the main and subscanning directions and writes them to the store 210 as contour data 210b. After the contour tracing unit 11 has traced all the contours included in the input image data 210a, the image discriminating unit 12 reads the contour data 210b out of the store 210 and checks the size of each contour to see if the assembly of black pixels in the input image data 210a is a noise image, a character image or a figure image (step 120). The result of discrimination is written to the store 210 as discrimination data 210c.

The vector generating unit 13 reads the discrimination data 210c out of the store 210 to extract figure images and transforms them into vectors (step 130), the resultant vector data 210d being written to the store 210. The figure recognizing unit 14 reads the vector data 210d out of the store 210, identifies straight lines, circles and other similar figure elements, and determines the relationship of the figure elements to one another as to connection (step 140). The results of recognition so performed by the unit 14 are written to the store 210 as figure element data 210e. The figure correcting unit 15 reads the figure element data 210e out of the store 210 by referencing the information which has been entered at the beginning of the copying operation for designating the directions for arranging lines. The figure correcting unit 15 corrects each figure element data 210e in a particular direction which is smaller in the difference in the angle to the associated designated direction than the others, while preserving its relationship to the other figure elements. If, among the corrected figure element data, three or more straight line elements are substantially parallel and the difference between their distances is smaller than a predetermined threshold, the straight line elements are so corrected as to equalize the distances to a mean value thereof with the connection of the elements being preserved (step 150). The corrected figure element data 210f are written to the storing means 210.

Specific methods for implementing the various processing steps of FIG. 2 are the same as in the first embodiment.

FIG. 17 indicates an interim result produced during the course of the above-stated processing. The image framing unit 16 writes to the store 210 the corrected figure element data 210f and the images determined by the discriminating unit 12 to be characters as the output image data 210g (step 160). Finally, the outputting unit 17 reads the output image data out of the store 210, forms images on the paper sheet 21, and then discharges the paper sheet 21 (step 170).

FIG. 18 shows images outputted by the procedure described above.

The processing for spacing parallel lines at equal intervals as mentioned above will be described in more detail. As shown in FIG. 17, assume that straight line elements $L_{11}$ to $L_{18}$ having been arranged are substantially parallel and spaced apart by substantially equal distances $Y_1$ to $Y_7$, and that straight lines $L_{21}$ to $L_{23}$ having been arranged are also substantially parallel and spaced apart by substantially equal distances $X_1$ and $X_2$. Then, the lines $L_{12}$ to $L_{18}$ are shifted in parallel so as to equalize the distances $Y_1$ to $Y_7$ to their mean value, while the lines $L_{22}$ and $L_{23}$ are shifted in parallel so as to equalize the distances $X_1$ and $X_2$ to their mean value. Consequently, as shown in FIG. 18, the lines $L_{12}$ to $L_{18}$ are corrected to lines $L'_{12}$ to $L'_{18}$ which are spaced apart by equal distances $Y'_1$ to $Y'_7$, while the lines $L_{22}$ and $L_{23}$ are corrected to lines $L'_{22}$ and $L'_{23}$ to equalize the distances $X'_1$ and $X'_2$ to each other.

FIG. 19 shows a document a part of which is marked to be processed. With this embodiment, it is also possible to process only a part of a document as illustrated by marking a desired area of a document beforehand. Again, such partial processing will be completed within a shorter period of time than the overall processing.

In summary, it will be seen that the present invention provides an image forming apparatus capable of correcting hand-written line images automatically and, therefore, outputting attractive images while freeing a person from time- and labor-consuming rewriting work. Further, the distances of hand-written rules are automatically regulated to produce substantially parallel and substantially equally spaced straight lines.

Various modifications will become possible for those skilled in the art after receiving the teachings of the present disclosure without departing from the scope thereof.

What is claimed is:

1. An image forming apparatus comprising:
   a) document reading means for optically reading a document to photoelectrically convert the document into two-level image data;
   b) contour tracing means for tracing a contour of an assembly of black pixels included in the image data and which are contiguous with one another;
   c) image discriminating means for classifying the assembly of black pixels into one of:
      1) a figure,
      2) a character, and
      3) noise based on a size of the contour of the assembly of black pixels which is determined by said contour tracing means;

d) vector generating means for extracting figure images based on discrimination data produced by said image discriminating means and transforming said figure images into vectors;

e) figure recognizing means for:
1) recognizing figure elements based on vector data produced by said vector generating means and
2) recognizing a connective relationship of said figure elements to one another;

f) figure correcting means for correcting, among the figure elements recognized by said figure recognizing means, straight line elements in a particular direction, the particular direction being smaller in difference in angle than other directions for arranging straight lines, the straight lines being selected at the beginning of a copying operation, while preserving any connections of said straight line elements to the other figure elements;

g) image framing means for framing the figure elements corrected by said figure correcting means; and h) outputting means for reading the corrected images and forming said images on a paper sheet.

2. An image forming apparatus comprising:
a) document reading means for optically reading a document to photoelectrically convert the document into two-level image data;
b) contour tracing means for tracing a contour of an assembly of black pixels included in the image data and which are contiguous with one another;
c) image discriminating means for classifying the assembly of black pixels into one of:
1) a figure,
2) a character, and
3) noise
based on a size of the contour of the assembly of black pixels which is determined by said contour tracing means;
d) vector generating means for extracting figure images based on discrimination data produced by said image discriminating means and transforming said figure images into vectors;
e) figure recognizing means for:
1) recognizing figure elements based on vector data produced by said vector generating means and
2) recognizing a connective relationship of said figure elements to one another;
f) figure correcting means for
1) correcting straight line elements such that said straight line elements are equally spaced apart by a mean value of distances, the distances having differences smaller than a predetermined threshold, while
2) preserving a relationship of said straight line elements to the other figure elements;
said figure correcting means performing said correcting when three or more straight line elements that are included in the figure elements recognized by said figure recognizing means are substantially parallel and spaced apart by distances, the distances having differences smaller than a predetermined threshold;
g) image framing means for framing the figure elements corrected by said figure correcting means; and
h) outputting means for reading the corrected images and forming said images on a paper sheet.

3. An apparatus as claimed in claim 2, further comprising:
direction designating means for designating directions for arranging straight line elements, said straight line elements being equally spaced apart from one another after said figure correcting means has corrected figure elements in a direction which is smaller in difference in angle than other directions, the other directions being those directions that are designated by said direction designating means.

4. An apparatus as claimed in claim 2, further comprising area designating means for designating an area to be processed by said vector generating means, said figure recognizing means and said figure correcting means.

5. An apparatus as claimed in claim 2, wherein said contour tracing means traces a contour of a two-level image stored in said storing means to produce a size of said contour;
said image discriminating means determining whether or not an image is a character image or a figure image on the basis of the size of the contour produced by said contour tracing means;
said vector generating means, said figure recognizing means and said figure correcting means processing an image only when said image is determined to be a figure image by said image discriminating means, said image framing means framing said figure image and an image determined to be a character image by said image discriminating means.

6. An image forming apparatus, comprising:
(a) document reading means for optically reading a document to photoelectrically convert the document into two-level image data;
(b) contour tracing means for tracing a contour of an assembly of black pixels which are included in the image data and which are contiguous with one another;
(c) image discriminating means for classifying the assembly of black pixels into one of:
1) a figure,
2) a character, and
3) noise,
based on a size of the contour of the assembly of black pixels which is determined by said contour tracing means;
(d) vector generating means for extracting figure images based on discrimination data produced by said image discriminating means and transforming said figure images into vectors;
(e) figure recognizing means for:
1) recognizing figure elements based on vector data produced by said vector generating means and
2) recognizing a connective relationship of said figure elements to one another;
(f) figure correcting means for correcting a direction of each figure element recognized by said figure recognizing means such that:
(1) when said figure element extends in a direction which makes an angle smaller than a predetermined angle with a particular direction, said direction of said figure element is corrected to said particular direction; while
(2) when said direction of said figure element makes an angle greater than said predetermined angle, said direction of said figure element is left as it is;

(g) image framing means for framing the figure elements corrected by said figure correcting means; and (h) outputting means for reading the corrected images and forming said images on a paper sheet.

7. The apparatus of claim 6, wherein said particular direction includes a plurality of directions.

8. The apparatus of claim 7, wherein:
said figure correcting means, after having corrected the direction of the figure element, extends or reduces a length of said figure element so as to preserve connections of said figure element with other figure elements.

9. An image forming apparatus, comprising:
(a) document reading means for optically reading a document to photoelectrically convert the document into two-level image data;
(b) contour tracing means for tracing a contour of an assembly of black pixels which are included in the image data and which are contiguous with one another;
(c) image discriminating means for classifying the assembly of black pixels into one of:
 1) a figure,
 2) a character, and
 3) noise,
 based on a size of the contour of the assembly of black pixels which is determined by said contour tracing means;
(d) vector generating means for extracting figure images based on discrimination data produced by said image discriminating means and transforming said figure images into vectors;
(e) figure recognizing means for:
 1) recognizing figure elements based on vector data produced by said vector generating means and
 2) recognizing a connective relationship of said figure elements to one another;
(f) figure correcting means for:
 1) correcting, among the figure elements recognized by said figure recognizing means, straight line elements that are in a particular direction, the particular direction being smaller in difference in angle than other directions, the particular direction being among directions for arranging straight lines and the particular direction being selected at the beginning of a copying operation; while
 2) preserving any connections between said straight line element and other figure elements;
(g) storing means for storing the figure elements corrected by said figure correcting means; and
(h) outputting means for reading the corrected images out of said storing means and forming said images on a paper sheet.

10. An image forming apparatus, comprising:
(a) document reading means for optically reading a document to photoelectrically convert the document into two-level image data;
(b) contour tracing means for tracing a contour of an assembly of black pixels which are included in the image data and which are contiguous with one another;
(c) image discriminating means for classifying the assembly of black pixels into one of:
 1) a figure,
 2) a character, and
 3) noise,
 based on a size of the contour of the assembly of black pixels which is determined by said contour tracing means;
(d) vector generating means for extracting figure images based on discrimination data produced by said image discriminating means and transforming said figure images into vectors;
(e) figure recognizing means for recognizing connecting points of vectors based on vector data produced by said vector generating means;
(f) figure correcting means for:
 1) correcting, among the vector data recognized by said figure recognizing means, straight line elements that are in a particular direction, the particular direction being smaller in difference in angle than the others, the particular direction being among directions for arranging straight lines and the particular direction being selected at the beginning of a copying operation; while
 2) preserving a connective relationship of said vector data;
(g) image framing means for framing figure elements corrected by said figure correcting means; and
(h) outputting means for reading the corrected images and forming said images on a paper sheet.

* * * * *